3,287,201
METHOD OF STRENGTHENING GLASS BY ION EXCHANGE AND ARTICLE MADE THEREFROM

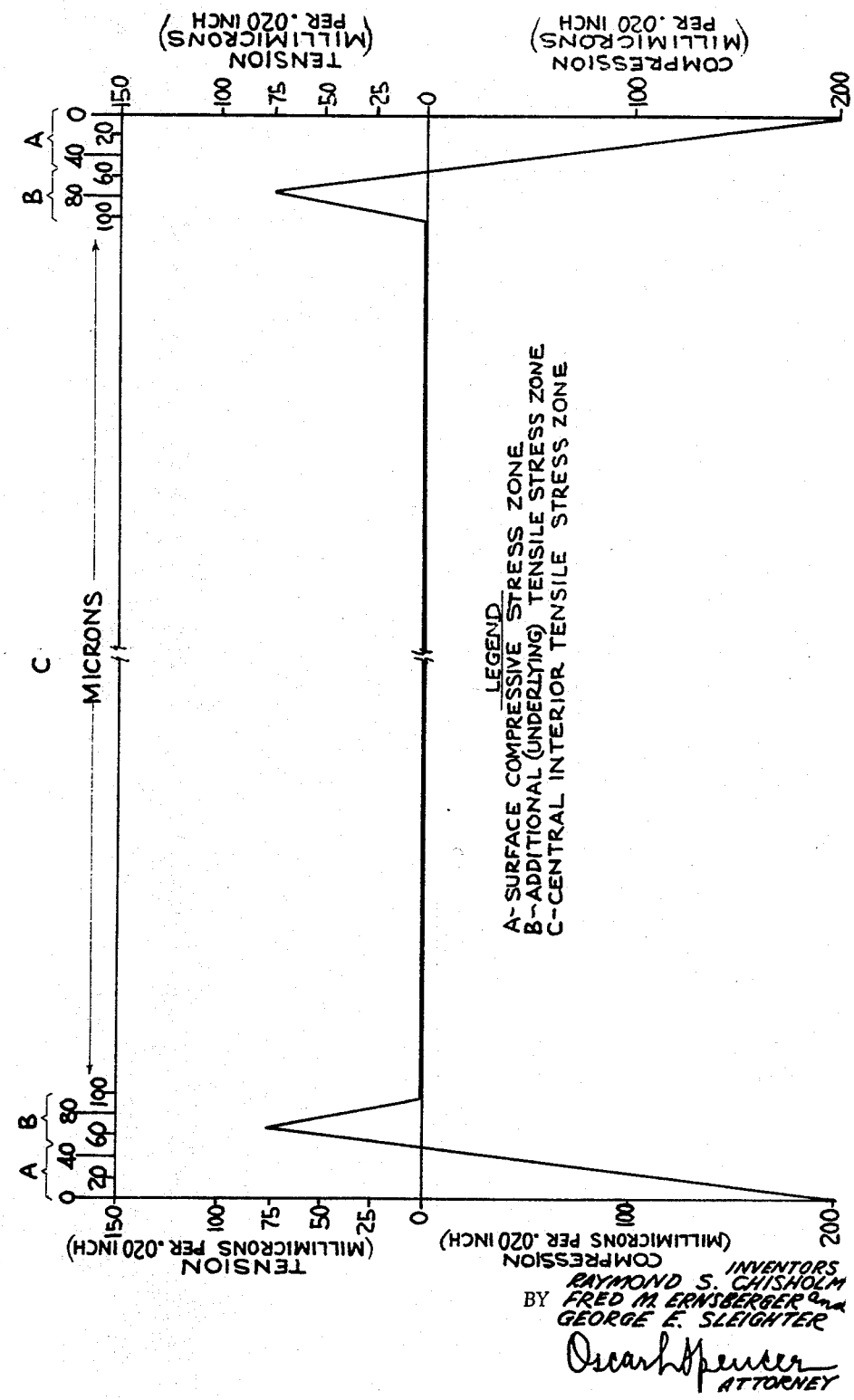

Raymond S. Chisholm, Pittsburgh, George E. Sleighter, Natrona Heights, and Fred M. Ernsberger, Pittsburgh, Pa., assignors to Pittsburgh Plate Glass Company, Pittsburgh, Pa., a corporation of Pennsylvania
Filed Jan. 7, 1963, Ser. No. 249,790
8 Claims. (Cl. 161—1)

This invention is directed to improved glass articles and methods of preparing such articles. More specifically the present invention is directed to improving the strength of glass, particularly lime-soda glass such as is used in the production of window or plate glass.

According to the present invention, increases in strength are secured in glass articles by first contacting glass with an inorganic compound of an electropositive element such as lithium or hydrogen of smaller atomic diameter than the predominant alkali metal in said glass at a temperature high enough to introduce this element into the glass without developing cracks or weakness defects in the glass surface, generally at a temperature above the strain point of said glass, and thereafter contacting said glass with a salt of an alkali metal of larger atomic diameter than said electropositive element at a temperature below the strain point of said glass. This process is especially useful because it may be applied to the low cost commercially available soda-lime glasses such as plate and window glass. Recourse to glasses of special composition containing high concentrations of lithium or like relatively expensive batch materials is not a requisite of this invention.

The invention will be further understood with reference to the accompanying drawing in which:

The figure of the drawing is a graphical representation showing a typical stress profile of glass treated in accordance with Example I of this invention.

As shown in the drawing, many of the glass articles of the present invention are characterized by a surface compressive stress zone, a central interior tensile stress zone and an additional tensile stress zone underlying said surface compressive stress zone yet exterior to said central interior tensile stress zone. This stress profile is present on both major surfaces of the glass articles of this invention, as can be seen from the figure of the drawing. The maximum tensile stress in said underlying or intermediate tensile stress zone is greater than the maximum tensile stress in said central interior tensile stress zone, and the ratio of the maximum compressive stress in said surface compressive stress zone to the maximum tensile stress in the central interior tensile stress zone is always at least 10 to 1, usually 1000 to 1 and greater, and sometimes greater than 10,000 to 1. The ratio of the maximum tensile stress in said underlying tensile stress zone to the maximum tensile stress in said central interior tensile stress zone is always at least 5 to 1, generally at least 100 to 1, and sometimes as high as 500 to 1 and even higher.

The central interior tensile stress zone contains an alkali metal, usually sodium or potassium, substantially in the concentration characteristic of the given glass composition subjected to treatment. In the case of soda-lime glass having the normal composition of plate or window glass, tests have shown that the underlying tensile stress zone contains a concentration of the electropositive element of smaller atomic diameter, e.g., lithium, which concentration is greater than that of the central interior tensile stress zone and may be preponderant to the concentration of the preponderant alkali metal of the central zone. The surface compressive stress zone contains a molar preponderance of an alkali metal, e.g., sodium and/or potassium, of larger atomic diameter than said lithium or like smaller electropositive element of said underlying tensile stress zone.

The preponderant alkali metal in the surface compressive stress zone can be of the same atomic diameter as the preponderant alkali metal in the central interior tensile stress zone, or the preponderant alkali metal in the surface compressive stress zone can be of larger atomic diameter than the preponderant alkali metal in the central interior tensile stress zone. Thus, the alkali metal in the surface compression zone and the base or central zone may be sodium.

Glass articles of this invention exhibit unique optical stress profiles in that a compression layer exists at the surface (surface compressive stress zone), whereas the zone underlying the surface compressive stress zone is in tension (underlying tensile stress zone) which tension decreases rather sharply in magnitude as the distance from the outer portion of the underlying tensile stress zone increases so as to approach a nominal tension towards the mid-plane of the glass article (central interior tensile stress zone). The central interior tensile stress zone has a nominal tension, viz., a tensile stress which is approximately the same as or even slightly below that of conventional annealed glass, viz., 20 to 150 pounds per square inch. Of course, the corresponding stress profile exists from the center of the glass sheet to the opposite surface, namely, the stress profile goes from the nominal tension of the central interior zone existing through the center to increased tension at the opposite underlying tensile stress zone and then sharply into high compression at the surface compressive stress zone which exists at the opposite surface thereof.

Glass of the type produced according to this invention is stronger and is less subject to failure under impact loads than untreated glass.

The thickness of the surface compressive stress zone for a given surface generally ranges from about 10 to about 200 microns and even thicker, usually being at least 40 microns in thickness. The underlying tensile stress zone is generally thinner than and seldom exceeds the thickness of the compressive stress zone. Usually the underlying tensile stress zone ranges from about 10 percent to 90 percent of the thickness of the surface compressive stress zone. The central interior tensile stress zone occupies the main central portion of the glass article as measured from the mid-plane of the glass article moving outwardly to both exterior surfaces.

One of the significant beneficial characteristics of the high strength glass articles provided in accordance with this invention is their ability to be cut readily without shattering. In this regard they differ markedly from ordinary thermally tempered glass.

Moreover, thin glass articles treated in accordance with the present invention not only possess a high surface strength but also are surprisingly flexible. For example, lime-soda-silica glass articles 0.090 inch thick when treated in accordance with the procedure of Example I (lithium treatment followed by sodium treatment) are sufficiently flexible to be bent around a circle having a 30 inch radius without fracture of the glass.

To some extent at least the strengthening of glass in accordance with this invention involves a selective series of metal atom exchange procedures. As a consequence of the first exchange treatment, which involves the exchange of the electropositive element of smaller atomic diameter for the larger preponderant alkali metal present in the base glass, there may be imposed a tension stress for a depth penetration measured by the depth of exchange of the smaller diameter electropositive element for the predominant alkali metal(s) present in the glass composition. However, in many cases the magnitude of the stress is small when the glass is cold and as disclosed below the surface may even be under compression under these circumstances.

The later atom exchange treatment or treatments are conducted by exposing the treated glass to an exchange of an alkali metal of larger atomic diameter than the said smaller electropositive element of the first treatment. This later exchange treatment or treatments imposes a compressive stress on the outermost surface of the glass article for a depth measured by the depth for which the larger atomic diameter alkali metal is exchanged for the smaller atomic diameter electropositive element.

The first exchange procedure is conducted at elevated temperatures to insure adequate penetration of the smaller diameter electropositive element in a reasonably rapid period of time and avoid breaking or fracturing the surface of the glass. The use of elevated temperatures allows the stresses imparted to the glass by the first exchange procedure to be at least partially thermally relaxed especially at the outer surface, thus minimizing the likelihood of cracking. To accomplish these objectives generally the first exchange procedure is conducted at temperatures above the strain point of the chosen glass composition. However, it should be realized that it is within the purview of this invention to conduct the first exchange procedure at lower temperatures over longer periods while avoiding or at least effectively minimizing surface stress cracking.

The later ion exchange treatment or treatments are conducted at a temperature below the strain point of the glass so as to avoid thermal relaxation of the compressive stresses at the time they are being imposed upon the glass by the exchange of the larger atomic diameter alkali metal for the smaller atomic diameter electropositive element.

This invention is applicable to a wide range of glasses containing in excess of 40 percent by weight of $SiO_2$ and if desired such other glass formers as boron and aluminum in the oxide form as well as various alkali metal and alkaline earth metal oxides.

Lime-soda glasses of the type contemplated normally contain at least about 10 percent sodium, determined as $Na_2O$, and at least about 5 percent calcium, determined as $CaO$, as well as 65 to 75 percent $SiO_2$. A representative range of composition in which the respective element content is determined as their respective oxides is as follows:

| | Percent by weight |
|---|---|
| $Na_2O$ | 10 to 20 |
| $K_2O$ | 0 to 5 |
| $CaO$ | 3 to 15 |
| $SiO_2$ | 65 to 75 |
| $MgO$ | 0 to 10 |
| $B_2O_3$ | 0 to 5 |
| $Al_2O_3$ | 0 to 5 |

Some of the $Na_2O$ in the above table can be replaced by $K_2O$.

A typical soda-lime glass suitable for use in accordance with this invention has the following composition:

| | Percent by weight |
|---|---|
| $SiO_2$ | 71.38 (usual variation 71 to 75) |
| $Na_2O$ | 12.76 (usual variation 12 to 16) |
| $K_2O$ | 0.03 (usual variation 0 to 1) |
| $CaO$ | 9.67 (usual variation 5 to 12) |
| $MgO$ | 4.33 (usual variation 2 to 5) |
| $Na_2SO_4$ | 0.75 (usual variation 0.1 to 1.0) |
| $Fe_2O_3$ | 0.15 (usual variation 0.1 to 1.0) |
| $Al_2O_3$ | 0.81 (usual variation 0.1 to 2.0) |

While the present invention will be illustrated hereinafter by discussion primarily relating to monolithic glass plates and sheets, it should be realized that the basic effect of the practice of the present invention is to increase substantially the scope of utility of glass to include its use where high strength properties and surface compression properties are advantageous in a myriad of fabricated articles of commerce. Hence, the value of the present invention extends not only to such articles as viewing closures, windshields, backlites and sidelites, but also to other glass articles such as those used in the contruction and building fields and all of the fields where materials are required to possess high strength proprties, e.g., architectural spandrels; windows; doors; bottles; glass tableware, e.g., cups, saucers, plates; skylights; etc.

This invention is especially advantageous because it is capable of strengthening ordinary soda-lime glass, e.g., window, plate or bottle glass, by providing it with a surface compression layer of unusual depth.

Treatment of such glass, for example, by immersion of the glass in molten potassium nitrate to exchange a larger atom, e.g., potassium from the treating salt for the sodium in the glass can be performed in order to improve the strength of the glass and impart a surface compression thereto. However, the depth of the glass under compression normally is quite hollow, rarely exceeding 10 to 20 microns even after very long immersions. Glass having such shallow surface portions under compression are subject to abrasions such as scratches which, potentially, can be deep enough to penetrate substantially such surface portion thus reducing the strength of the glass.

In contrast, by practicing the present invention surface compression zones which exceed 10 to 20 microns and range from 30 to 200 microns can be obtained readily and without difficulty. Thus, ordinary glass of low cost can be substantially strengthened and provided with a durable surface portion which is under compression to such a depth as to decrease the likelihood of loss of glass strength due to scratches and other abrasions occasioned by ordinary wear and tear.

A further advantage is that the glass thus obtained has durability not substantially different from that of ordinary soda-lime glass. This is particularly true when sodium is exchanged for the smaller atom in the second treatment since in this case the gross chemical composition (and perhaps even atomic orientation) of the treated glass does not differ substantially from that of the original untreated glass.

Prior to the first exchange treatment, viz., treatment with a salt of an electropositive element having a smaller atomic diameter than the predominant alkali metal in the chosen glass composition, it is found preferable to heat the glass article to be treated to a temperature within a range of 50° F. above or below the temperature at which the first exchange treatment is to be conducted, viz., the temperature at which the exchange treating bath is maintained during treatment. Preferably the glass article is preheated to a temperature fairly closely approximating that at which the first exchange treatment is conducted. By this means surface cracking of the glass and undue chilling of the first treating bath are avoided.

In a typical method of performing this invention the preheated glass, for example, window or plate glass in sheet form, is dipped in a molten bath of a salt of lithium, such as lithium sulfate. The temperature of the bath should be high enough to avoid or minimize formation of cracks or defects as a consequence of the treatment. Thus, the treatment tends to cause introduction of lithium into the glass, e.g., by a replacement of lithium for the sodium of the glass and thereby to develop a surface tension in the glass which can produce cracks. By conducting the lithium treatment at a high enough temperature stresses cerated by the introduction of lithium are relaxed enough to prevent cracking.

The exact temperature of the dip depends upon the properties of the base glass. For lime-soda glass, temperatures above 800° F. normally are required, a suitable temperature being 1000 to 1100° F. or other temperatures above the strain point of the glass. The temperature rarely is above that at which the glass is molten.

A convenient period of contact between the lithium salt and the glass is about 5 to 20 minutes, although longer times of immersion, for example, several hours, can be employed. The result is to produce a glass in which the lithium content of the surface has been enhanced, i.e., the lithium concentration of the surface portion is substantially above (more than twice) that of the interior. The depth of this enhancement of lithium concentration is above 10 to 20 microns. Where the temperature of treatment is not high, this surface may be under a small tensile stress. When the glass is cooled to room temperature, it may be essentially unstressed. If the treatment is conducted at a high temperature so that all tensile stress produced by the lithium is relaxed, the glass when cooled may have its external surface under compression.

The glass having this enhanced lithium content on the surface is then immersed in molten sodium nitrate or like molten sodium salt at a temperature below the strain point or at least below about 1000° F. for a period of time ranging from 5 minutes up to several hours or even longer with a period of 5 to 30 minutes usually being sufficient. Longer periods of immersion are not objectionable so long as the surface compressive stress induced by the treatment is retained. The result is to deplete the lithium on the surface and thereby to regenerate a surface which, while it is under compression, does not differ materially in chemical composition from that of the base glass since exchange of the lithium initially introduced for sodium takes place to a depth of 20 to 200 microns or even deeper depending upon the depth of the initial lithium penetration.

In lieu of a sodium salt, a molten potassium salt can be used to replace lithium with potassium thereby producing glass of even greater strength. Also molten mixtures of sodium and potassium salts may be used.

The salts used should be relatively stable at the temperatures of operation. Typically satisfactory salts are the sulfates, nitrates, chlorides, fluorides, and phosphates of the above metals, lithium, sodium, potassium and the like.

Another advantageous embodiment of this invention involves the strengthening of lime-soda-silica glass by a three-step series of exchange treatments. The first exchange treatment is conducted by immersion of a glass article into a bath of molten lithium salt at a temperature above the strain point of the glass. The second exchange treatment is conducted by immersing the thus treated glass article into a bath of molten sodium salt at a temperature below the strain point of the glass, e.g., temperatures ranging from about 750° to 850° F. whereby the sodium concentration on the surface is increased, and the lithium concentration is decreased. The third exchange procedure is conducted by immersing the thus treated glass into a bath of molten potassium salt maintained at a temperature below the strain point of the glass, e.g., temperatures ranging from about 750° to 850° F. In this step potassium replaces at least a portion of the sodium in the outer surface portions of the glass.

Such successive treatments, all of which are preferably conducted at temperatures below the strain point of the glass, can serve to increase the thickness and compressive strength of the surface compressive stress zone.

Usually the glass is cooled between each exchange treatment to a temperature roughly approximating room temperature, viz., a temperature ranging from 200° F. down to and even below room temperature. Following cooling the glass is usually subjected to aqueous rinsing prior to subsequent exchange treatments.

In place of a first lithium exchange treatment, lime-soda-silica glass can be first treated with a hydrogen salt to substitute hydrogen for sodium, for example, by subjecting the glass to a molten acid salt, such as sodium acid sulfate or the like. Hydrogen treatment can also be effected by treating the glass with an acid, e.g., sulfuric acid. Generally the acid will be volatilized at treatment temperatures used in the first exchange. Or instead of either lithium or hydrogen, other salts of an electropositive element(s) having an atomic diameter smaller than sodium (the predominant alkali metal in lime-soda-silica glass) can be used as long as said salts effect an exchange of their electropositive element(s) at a temperature above the strain point of the particular lime-soda-silica glass composition chosen for treatment.

The term "atomic diameter" as used herein means the "crystal angstroms" atomic diameter as expressed in kilo-X, viz., kX units. These kX units are smaller than "absolute angstroms," and $kX = A/1.0020$. The term atomic diameter as used herein denotes the kX as reported on pages 20–23 (column 4) of the booklet Key to the Welch Periodic Chart of the Atoms (1959) by William F. Meggers. The atomic diameter values in said booklet were mainly taken from The Structure of Metals and Alloys by William Hume-Rothery, The Institute of Metals, London, 1945.

The following examples serve to illustrate the invention in greater detail. However, it should be understood that the invention in its broadest aspects is not necessarily limited to the particular materials, temperatures, treatment times and other conditions set forth below in the examples.

*Example 1*

The glass subjected to treatment is conventional plate glass which has the following composition:

| Component: | Composition (percent by weight) |
|---|---|
| $SiO_2$ | 71.65 |
| $Na_2O$ | 13.20 |
| $K_2O$ | 0.03 |
| CaO | 11.83 |
| MgO | 2.40 |
| $Al_2O_3$ | 0.20 |
| $Na_2SO_4$ | 0.57 |
| $Fe_2O_3$ | 0.117 |

Polished flat glass plates 4 inches by 4 inches by 0.125 inch of this glass are preheated to a temperature of 1050° F. plus or minus 20° F. in an insulated oven over a period of approximately 15 minutes.

Then the preheated plates are directly immersed into a molten lithium salt bath which is at a temperature of 1050° F. and contains 80 mole percent lithium sulfate and 20 mole percent potassium sulfate for a period of 10 minutes to effect exchange of lithium for sodium. In this immersion treatment, the molten lithium salt bath is contained in a fused lined 2000 milliliter cylindrical stainless steel beaker of 8 inches height, approximately 1/32 inch wall thickness and having an inner diameter of approximately 5⅝ inches. The fused liner is a preformed cylinder sold under the designation "Vitreosil" by the Thermal American Fused Quartz Company, and is 8 inches in height and has an inner diameter of approximately 5 inches and a wall thickness of approximately 0.5 inch. The fused silica liner contains 99.9 to 99.93 percent by weight silica, $SiO_2$, with alumina, $Al_2O_3$, representing two thirds of the total impurities.

The fused silica liner is fitted into the stainless steel beaker. Then the lithium salt is placed into the fused silica liner and heated to the treatment temperature (1050° F.). The sample glass plates are mounted vertically on a stainless steel rack which carries five sample plates each spaced approximately 0.250 inch on each major surface from an adjacent plate. The rack containing five sample plates is then placed into the molten lithium salt bath to completely immerse all plates therein. The molten lithium salt bath is maintained at a sufficient depth, approximately six inches, to allow complete immersion of each sample.

At the end of the ten minute immersion, the rack and lithium treated plates are removed from the molten lithium bath and gradually cooled to room temperature. Then the lithium treated plates are rinsed with water to remove excess lithium salt and dried.

These lithium treated plates, which have their surfaces under compression, and whose surfaces contain lithium introduced by exchange to a depth of approximately 100 microns, are preheated to a temperature of approximately 800° F. over a ten minute period, and then totally immersed by the same procedure in a molten bath of sodium nitrate at 800° F. for 60 minutes. After removal of the sodium treated plates from the molten sodium salt bath, the plates are cooled gradually to room temperature, washed with water to remove excess sodium salt and dried.

These lithium-sodium treated plates are optically measured for stress magnitude and thickness of the (outer) surface compressive stress zone, the underlying tensile stress zone and the central interior tensile stress zone. The samples are also tested for load breaking strength.

The optical stress measurements, both tensile stress and compressive stress, are measured by birefringence using a graduated quartz wedge (prism) looking through 0.020 inch sections of the 0.125 inch thick treated glass plates. Using a diamond cutting wheel, a 0.020 inch section is cut with the nearest cut being no less than 0.5 inch from the sample edge. The 0.020 inch section is then mounted on a microscope side so that the 0.020 inch dimension is normal to the surface of the microscope slide. Then index matching fluid, viz., oil having the same index of refraction as the glass section, is placed over the glass surface. The section, thus mounted on the microscope slide, is then placed on the stage of a petrographic microscope (one containing the polaroids built into the optical system below the stage surface) equipped with a quartz wedge. The quartz wedge is calibrated in millimicrons. The sample to be measured is viewed by looking at the 0.125 inch surface through the 0.020 inch dimension, viz., the polarized light passes through the 0.020 inch dimension. The zone of the sample which is to be measured is selected and the stress of that zone is measured by looking through that zone. The compressive stress at the surface (compressive stress zone) is measured by looking through the 0.020 inch surface at either edge of 0.125 inch dimension. The tensile stress of the central interior tensile stress zone is measured by looking through the 0.020 inch surface at the center of the 0.125 inch dimension. The tensile stress of the additional tensile stress zone (intermediate or underlying tensile stress) is measured by looking through the 0.020 inch surface at a location on the 0.125 inch dimension which is between the center and either edge but closer to either edge, e.g., approximately 50 to 150 microns from either edge of the 0.125 inch surface. Since the sample section is 0.020 inch thick, the measured values are multiplied by 50 to express the stress in terms of millimicrons per inch. Then the optical rating of tensile stress in millimicrons per inch is converted to mechanical pounds per square inch stress units by multiplying by the stress optical coefficient of 2.13, which applies not only for the glass composition listed above in this example but also for most conventional plate and sheet glass. In Table I below the optically determined stress values are set forth in pounds per square inch.

The load strength tests are conducted using concentric ring loading on the four-inch square 0.125 inch thick test plates. The larger circular ring has an internal diameter of 3 inches whereas the smaller circular ring has an internal diameter of 1.5 inches. Both concentric rings have knife edges which contact the glass surfaces in a direction normal to the 4 square inch area thereof. The load speed is 0.02 inch per minute, and the reported load strength is the average load strength (pounds per square inch) at which failure (glass breakage) occurs for the tested samples, all of which are identically treated for strengthening. This load strength in pounds per square inch is arrived at by multiplying the actual load strength (pounds) by the stress conversion factor, which is 34.88, which applies to 0.125 inch thick plate glass within the realm of experimental error.

The load strength and optical stress data are summarized in Table I below in comparison with corresponding values of 4 inch by 4 inch by 0.125 inch control samples of polished flat glass plates of identical glass composition but having no strengthening treatment.

TABLE I

|  | Preferentially Exchange Strengthened Plates | Untreated Plates |
|---|---|---|
| Optical Surface Compressive Stress (pounds per square inch) | 35,000 | 480 |
| Thickness of Surface Compressive Stress Zone (microns) | 50 | 800 |
| Optical Underlying Tensile Stress (pounds per square inch) | 8,000 |  |
| Thickness of Underlying Tensile Stress Zone (microns) | 40 |  |
| Optical Center Tensile Stress (pounds per square inch) | 15 | 213 |
| Load Strength (pounds) | 1,233 | 258 |
| Load Strength (pounds per square inch) | 43,000 | 9,000 |

*Example II*

In this test the glass used is sheet glass and has the following composition:

| Component: | Composition A (percent by weight) |
|---|---|
| $SiO_2$ | 71.35 |
| $Na_2O$ | 13.24 |
| $K_2O$ | 0.03 |
| $CaO$ | 11.76 |
| $MgO$ | 2.41 |
| $Al_2O_3$ | 0.12 |
| $Na_2SO_4$ | 0.53 |
| $Fe_2O_3$ | 0.53 |

Polished glass sheets 4 inches by 4 inches by 0.125 inch of the composition listed above are provided. The sheets are preferentially exchange treated first with lithium, then with sodium as in Example I to improve the strength thereof. The average optical stresses and load strength of these sample sheets are essentially the same as the corresponding values of the strengthened plates of Example I.

*Example III*

Polished lime-soda-silica flat glass plates 4 inches by 4 inches by 0.125 inch of the composition listed above in Example I are provided. These plates are preferentially exchange treated first with lithium, then with sodium as in Example I. Then these plates are preheated to 800° F. and subjected to a further compressive stress treatment by immersion in a molten potassium nitrate salt bath at 800° F. for immersion periods ranging from 15 minutes to 8 hours followed by removal, gradual cooling to room temperature, aqueous rinsing and drying.

As a result of this potassium treatment both the average optical compressive stress and average load strength are improved over that attained using the two step lithium-sodium exchange treatment of Example I.

The total thickness of the surface compressive stress zone is essentially unchanged from that recorded in the sample plates of Example I, but the outermost portion (3 to 30 microns) of the surface compressive stress zone, which contains a potassium content which is above that of internal portions of the glass primarily due to potassium exchange for sodium, possesses a higher compressive stress than the remaining intermediate 20 to 47 microns of the surface compressive stress zone in which the alkali metal is predominantly sodium primarily due to sodium exchange for lithium.

The average thickness and tensile stress magnitude of the underlying tensile stress zone is essentially unchanged from that recorded in conjunction with the sample plates of Example I. The same is true of the central interior tensile stress zone.

The difference between the maximum and minimum compressive stress per unit thickness in the potassium induced upper portion (3 to 30 microns) of the surface compressive stress zone (measured from the bottom thereof to the outer surface) is greater than that in the sodium induced lower portion of the compressive stress zone (measured from the interior to exterior thereof). That is to say the slope of the compressive stress curve (plotting magnitude of compressive stress against depth of the zone) in the potassium induced (upper) portion of the surface compressive stress zone is steeper than that in the sodium induced (lower) portion of the surface compressive stress zone.

Depth of the potassium exchanged portion of the surface compressive stress zone is essentially directly proportional to the length of the immersion period during which the plates are treated with molten potassium nitrate, viz., the longer the potassium treatment, the deeper the potassium exchange for sodium at a given potassium treating temperature.

*Example IV*

Polished flat glass plates 4 inches by 4 inches by 0.125 inch of the composition listed in Example I are preheated to a temperature of 1050° F. and directly immersed in a molten (1050° F.) lithium salt bath for a period of 10 minutes to effect exchange of lithium for sodium following the same treating procedure indicated in Example I. After lithium treatment these plates are removed from the lithium bath and gradually cooled to room temperature. These plates are then washed with water and dried.

Then the lithium treated plates are heated to a temperature of approximately 800° F. over a period of 15 minutes after which the heated plates are directly immersed into a molten salt bath of potassium nitrate at 800° F. for 4 hours. After removal from the molten potassium bath, these plates are allowed to cool gradually to room temperature, and are subsequently rinsed with water and dried. Optical stress and load strength determinations reveal substantial increases in optical compressive stress and load strength compared to untreated plates of identical glass composition and size.

*Example V*

Polished flat glass plates 4 inches by 4 inches by 0.125 inch of the composition listed above in Example I are preheated to a temperature of 1050° F. plus or minus 20° F. in an insulated oven over a period of approximately 15 minutes.

Then the preheated plates are directly immersed into a molten sodium bisulfate bath at a bath temperature of 1050° F. for a period of 10 minutes to effect exchange of hydrogen from the sodium bisulfate salt for sodium present in the glass. At the duration of the 10 minute immersion period, the sample plates are removed from the molten sodium bisulfate bath, and gradually cooled to room temperature. The hydrogen treated plates are then washed in water and dried.

These plates are then heated to a temperature of approximately 800° F. over a period of 10 minutes and then totally immersed in a bath of sodium nitrate at a temperature of 800° F. for 15 minutes. After removal of the sodium treated plates from the molten sodium nitrate salt bath, the plates are cooled gradually to room temperature, washed with water to remove excess sodium salt, and dried. After drying, the plates are subjected to optical stress measurement and load strength testing as in Example I. Optical stress measurements reveal the presence of a surface compressive stress zone averaging 50 microns in depth and of a magnitude approximating that secured in Example I above. Beneath the surface compressive stress zone there is an underlying tensile stress zone averaging approximately 40 microns in thickness and having a maximum tensile stress of the same order as that obtained in Example I. The average central interior tensile stress of the hydrogen-sodium strengthened plates is slightly below that of conventionally annealed plate glass.

*Example VI*

Polished flat glass plates 4 inches by 4 inches by 0.125 inch of the composition listed above in Example I are provided. These plates are serially treated first with molten sodium bisulfate at a temperature of 1050° F. and then with molten sodium nitrate at a temperature of 800° F. in the same manner indicated in Example V above. The hydrogen-sodium treated plates are then cooled gradually to room temperature, rinsed with water, and dried. Then these hydrogen-sodium treated plates are heated to a temperature of approximately 800° F. over a period of 15 minutes followed by direct immersion into a molten potassium nitrate salt bath at 750° F. for 8 hours. After removal of the hydrogen-sodium-potassium treated plates from the potassium nitrate bath, they are allowed to cool gradually to room temperature. The plates are then washed with water and dried. Optical stress measurements and load strength tests are then performed on these plates. From these measurements it is apparent that both the optical surface compressive stress and load strength of the hydrogen-sodium-potassium treated plates are greater than the corresponding values obtained for the hydrogen-sodium strength treated plates of Example V. Both the thickness and magnitude of the underlying tensile stress zone of these plates are essentially the same as recorded above for the plates of Example V. The same is true of the central interior tensile stress of these plates as compared with those of Example V.

The benefits and advantages attendant to the method and articles of the present invention are generally applicable to glass articles regardless of their thickness. It is especially advantageous when applied to thin glass which is difficult to thermally temper, such as glass ranging from approximately 0.060 inch and below. However, thicker glass articles, viz., articles having thicknesses of ¼ inch all the way up to extremely thick glass articles such as structural glass articles, e.g., glass doors and the like, may be subjected to treatment as contemplated herein.

In the production of the articles of this invention over extended periods of time, when a plurality of glass articles are successively immersed in the various molten alkali metal treating baths, the composition of the baths must be controlled to prevent alkali attack upon the glass surfaces being treated. For example, in the first stage of the exchange treating process, wherein the glass plates are treated with an electropositive element having a smaller atomic diameter than the predominant alkali metal present in the glass, it was noted that unless the build-up of acidity and/or alkalinity in the lithium salt treating bath was neutralized, either acid or alkali attack on the glass resulted. For this purpose the molten lithium salt bath is neutralized with either potassium bisulfate or $SO_2$ gas to combat a build-up of alkali in the lithium treating bath. Of course an acid build-up is neutralized by use of any suitable alkaline material and in similar fashion. For this reason, when the first ion exchange treatment is conducted using a molten lithium salt bath, the composition of the molten bath is controlled so that the mole percent of available hydroxyl groups (alkali) is below about 0.005 percent. In similar fashion the mole percent of hydrogen (acidity) of the molten lithium salt bath is maintained below about 0.0005 mole percent. The alkaline or acid accumulated build-up in the molten lithium salt bath is determined periodically by removing a sample from the molten lithium salt bath, cooling the sample, dissolving it in water and titrating using a 0.1 N acid or base titrating solution containing appropriate indiactor. The sample is then titrated until appearance of the neutral color is achieved by titration.

The subsequently employed molten alkali metal salt baths (using alkali metals having larger atomic diameters than the electropositive element employed during the first exchange treatment) present similar problems as far as acid and alkaline contamination as well as build-up of exchanged smaller atomic diameter alkali metals in these treating baths. These baths are mainained using similar precautions indicated above in conjunction with the molten lithium salt bath. However, the later exchange treatments using the larger atomic diameter alkali metal salt baths do not require as close control in maintenance of limitations on basicity and acidity as the molten lithium salt bath employed for the first exchange treatment.

For example, when lime-soda-silica glass is first exchange treated with lithium followed by later exchange treatments by immersion in molten sodium nitrate and then immersion in molten potassium nitrate, the sodium content of the molten potassium nitrate bath increases. In general for uniform treating results in the potassium treatment stage of this process, the sodium content of the bath is held below 10.0 percent by weight and preferably below 5.0 percent by weight based upon the combined weight of sodium and potassium in the bath. Most preferably the sodium content is maintained at a level ranging downwardly from 1.0 percent by weight to a value approaching and even reaching 0 percent by weight. In such a treatment procedure the sodium content of the molten potassium treating bath should not be permitted to vary more than 5, and preferably less than 2 percent by weight (based upon the total combined weight of sodium and potassium in the molten potassium bath) from the early (low sodium content) stage of immersion to the latter (higher sodium content) stage thereof, even though pluralities of glass articles are dipped over a period of 1 to 20 weeks. In order to counteract the build-up of sodium in the potassium salt exchange treating bath, the bath composition can be adjusted by periodic addition of potassium salt in amount sufficient to replace consumed or withdrawn potassium, thus enabling a favorable concentration of potassium nitrate in the molten potassium salt treating bath. Also portions of the bath can be withdrawn, purified, and then recycled back for treatment.

The present invention can be employed to produce glass articles which are also subjected to conventional processing techniques, such as thermal tempering (preferably performed subsequent to the first exchange treatment and prior to the later exchange treatment(s); cutting operations; laminating operations; etc., to produce glass articles having enhanced surface strength, impact resistance and penetration resistance.

As will be noted from the foregoing, the present invention is by no means limited to glass sheets but can be employed to produce windshields, building materials, architectural glass, bottles, drinking glasses, tableware, viewing closures such as window panes, safety glass and other laminated structures, glass insulation structures wherein a plurality of glass sheets are arranged in spaced fashion with a layer of air serving as the insulation medium, television safety glass implosion and/or explosion shields, glass roofs or transparent domes in vehicles and buildings, experimntal devices such as glass engine parts which must withstand a high compression, ceramic and siliceous articles used in the dental art such as dentures and crown caps, ceramic mufflers for automobiles, airplanes and other vehicles, etc.

According to a further embodiment, the lithium or like treatment can be conducted below the strain point of the glass. Thereafter the glass can be heated above its strain point to relax tensile strains therein, for example, at a temperature of 1000° F. to 1300° F. If this heat treatment is conducted for a long enough time and high enough temperature, glass which is under surface compression when cooled is obtained. Also any surface defects which may have developed in the course of the treatment can be healed by the heating.

Following this the second exchange treatment can be conducted as hereinabove disclosed.

While the various exchange treatments can be conducted effectively by immersion of the glass in a molten bath, other methods of treatment can be used. Thus, the glass can be sprayed or otherwise coated with a coating of the lithium salt and the glass heated to a temperature at which the lithium salt is molten, e.g., to 1050° F.

This step may be performed as an incident to bending the glass. Glass thus coated can be placed on bending irons and passed through the usual bending cycle, care being taken to hold the glass at a high temperature (for example, above the strain point) for a long enough period to ensure penetration of the lithium. The glass is then bent and exchange treated in the same operation. This bent glass is cooled and dipped in the molten sodium or potassium salt as described above.

Furthermore, the sodium or potassium treatment can be effected by coating the glass with the salt and heating to a suitable temperature, for example, 700 to 900° F.

As shown in Example I, a lithium composition comprising 80 mole percent lithium sulfate and 20 mole percent potassium sulfate is used in the first treatment. This is done to enable use of a lithium salt bath which is molten at temperatures below the thermal deformation temperature of soda-lime glass and to minimize development of surface cracks. By use of a salt composition in which the lithium content is below that of the pure neutral salt, probability of such cracks being produced is reduced. Heat stable salts which do not etch the glass other than sulfates, including the chlorides, fluorides, phosphates, nitrates and the like can be used in lieu of sulfates in the above process so long as the temperatures are held low enough to avoid an undesirable degree of decomposition of the salt and/or attack and impairment of the surface of the glass. Even if some such surface attack takes places in the deposit of the lithium or like atom, it may be healed to a degree by heat treatment prior to the subsequent sodium and/or potassium treatment.

While the above examples illustrate the use of sodium and/or potassium alkali metal salts for the later exchange treatment of lithium or hydrogen exchange treated soda-lime glass, it should be realized that such later exchange treatment can be conducted using inorganic salts of other alkali metals above the electropositive element used for the first exchange treatment in the atomic series viz., an inorganic salt of an alkali metal having an atomic number larger than the electropositive element of the first exchange treatment. Thus, e.g., lithium, copper, cesium, rubidium and silver inorganic salts can be employed for the later exchange treatment of soda-lime glass which has been first exchange treated with hydrogen. Correspondingly, lithium treated glass can be subjected to a later exchange treatment using, e.g., inorganic salts of copper, cesium, rubidium or silver.

Although the present invention has been described with respect to specific details of certain embodiments thereof, it is not intended that such details serve as limitations upon the scope and spirit of the present invention. The present invention in its broadest aspects is not necessarily limited to the specific compositions, temperatures and treatment times specified in the foregoing examples.

What is claimed is:

1. A method of strengthening an alkali metal containing glass which comprises replacing the alkali metal ions in a surface of the glass by smaller electropositive metal ions selected from the group consisting of the ions of alkali metals, copper, silver and hydrogen by contacting the glass with a source of said smaller electropositive metal ions while retaining the glass at a temperature above the strain point of the glass, reducing the temperature of the glass below the strain point after said replacement, and thereafter replacing said smaller electropositive metal ions with larger electropositive metal ions selected from the group consisting of the ions of alkali metals, copper and silver by contacting the glass with a source of said larger electropositive metal ions while retaining the temperature of the glass below the strain point of the glass until the surface is placed in compression by said latter replacement.

2. The method of claim 1 wherein the selected larger and smaller electropositive metal ions are alkali metal ions.

3. The method of claim 1 wherein the selected smaller electropositive metal ions are hydrogen ions.

4. The method of claim 3 wherein the replacement of alkali metal ions in the glass by hydrogen ions is accomplished by contacting the glass with a molten acid sulfate at a temperature above the strain point of the glass.

5. The method of claim 1 wherein the glass is a lime-soda-silica glass and the smaller electropositive metal ions are lithium ions.

6. The method of claim 1 wherein the strengthening steps are followed by cutting the strengthened article into smaller strengthened portions.

7. A strengthened glass article produced according to the process set forth in claim 1.

8. A strengthened glass article having a stress pattern substantially as shown in the single figure in the drawing.

References Cited by the Examiner

UNITED STATES PATENTS

| | | | |
|---|---|---|---|
| 2,154,490 | 4/1939 | Burch | 65—31 |
| 2,779,136 | 1/1957 | Hood et al. | 65—30 |
| 3,107,196 | 10/1963 | Acloque | 65—115 |
| 3,218,220 | 11/1965 | Weber | 65—111 |

OTHER REFERENCES

Kistler, "Stresses in Glass Produced by Nonuniform Exchange of Monovalent Ions," J. of Amer. Cer. Soc., vol. 45, No. 2, pp. 59–68, February 1962.

DONALL H. SYLVESTER, *Primary Examiner.*

S. LEON BASHORE, *Examiner.*

G. R. MYERS, *Assistant Examiner.*

Notice of Adverse Decision in Interference

In Interference No. 95,963 involving Patent No. 3,287,201, R. S. Chisholm, G. E. Sleighter and F. M. Ernsberger, METHOD OF STRENGTHENING GLASS BY ION EXCHANGE AND ARTICLE MADE THEREFROM, final judgment adverse to the patentees was rendered May 26, 1969, as to claims 1, 2, 5 and 7.

[*Official Gazette November 25, 1969.*]

Disclaimer 3,287,201.—*Raymond S. Chisholm*, Pittsburgh, *George E. Sleighter*, Natrona Heights, and *Fred M. Ernsberger*, Pittsburgh, Pa. METHOD OF STRENGTHENING GLASS BY ION EXCHANGE AND ARTICLE MADE THEREFROM. Patent dated Nov. 22, 1966. Disclaimer filed Nov. 26, 1969, by the assignee, *PPG Industries, Inc.*

Hereby enters this disclaimer to claims 1, 2, 5 and 7 of said patent.

[*Official Gazette February 10, 1970.*]